United States Patent [19]
Sato et al.

[11] Patent Number: 5,372,292
[45] Date of Patent: Dec. 13, 1994

[54] TAPE BONDING APPARATUS

[75] Inventors: Koji Sato, Fussa; Tetsuya Kobaru, Hachioji, both of Japan

[73] Assignee: Kabushiki Kaisha Shinkawa, Tokyo, Japan

[21] Appl. No.: 31,240

[22] Filed: Mar. 12, 1993

[30] Foreign Application Priority Data

Mar. 12, 1992 [JP] Japan .................. 4-087453

[51] Int. Cl.$^5$ .................................. H01L 21/603
[52] U.S. Cl. .................. 228/44.7; 228/6.2; 228/8
[58] Field of Search ............ 228/180.2, 212, 6.2, 228/8, 44.7, 47, 106, 5.5

[56] References Cited

U.S. PATENT DOCUMENTS

| | | | |
|---|---|---|---|
| 4,013,209 | 3/1977 | Angelucci et al. | 228/6.2 |
| 4,054,238 | 10/1977 | Lloyd et al. | 228/6.2 |
| 4,887,758 | 12/1989 | Suzuki et al. | 228/6.2 |
| 4,913,336 | 4/1990 | Yamazaki | 228/180.2 |
| 5,106,011 | 4/1992 | Yamazaki et al. | 228/253 |

FOREIGN PATENT DOCUMENTS 3-32035  2/1991  Japan .

*Primary Examiner*—Samuel M. Heinrich
*Attorney, Agent, or Firm*—Koda and Androlia

[57] ABSTRACT

A tape bonding apparatus for bonding leads of a film carrier to bumps of a pellet including a linear cam that moves up and down a bonding stage which carries the pellet. A vertical movement adjustment assembly made up with an eccentric shaft, an adjustment lever and an adjusting screw adjusts the relative amount of vertical movement of the bonding stage with respect to the linear cam. A gap sensor detects the amount of the vertical movement of the bonding stage and shows the distance between the leads and the bumps in a numeric value. Thus, the distance or clearance between the leads and the bumps can be adjusted easily.

1 Claim, 4 Drawing Sheets

TAPE BONDING APPARATUS

BACKGROUND OF THE INVENTION

1. Field of the Invention

The present invention relates to a tape bonding apparatus which pressure-bonds leads of a film carrier to bumps of pellets.

2. Prior Art

Tape bonding in semiconductor fabricating apparatuses is performed such that, as shown in FIG. 5(a), bumps 2a of a pellet 2 are set beneath the leads 1a of a film carrier 1 with a fixed clearance C in between, and then, the leads 1a are pressure-bonded to the bumps 2a by a bonding tool 3. At the same time, as shown in FIG. 5(b), the leads 1a are shaped so that the leads are bent into a predetermined configuration. This is called a "forming."

In conventional tape bonding apparatus, however, no consideration is given to the amount of forming. In other words, the clearance C is determined by performing actual bonding repeatedly on a trial basis and measuring and adjusting the amount of forming. Japanese Patent Application Publication (Kokai) No. 3-32035 discloses an example of this type of tape bonding.

In the prior art described above, not only does the adjustment of the amount of forming require a considerable amount of time, but also the amount of forming tends to be different depending on the worker who performs the clearance adjustment. In addition, since the amount of forming cannot be monitored when the bonding apparatus is in operation, sufficient quality control is not achieved.

SUMMARY OF THE INVENTION

Accordingly, the object of the present invention is to provide a tape bonding apparatus which allows easy setting of the amount of forming, reduces the differences in the amount of forming caused by different operators, and makes it possible to monitor the amount of forming during the operation of the apparatus so that sufficient quality control is achieved.

The object of the present invention is accomplished by a unique structure for a tape bonding apparatus which pressure-bonds leads of a film carrier to bumps of pellets, and the unique structure includes a bonding stage which carries the pellets thereon and is moved up and down, a vertical driving means which moves the bonding stage up and down, an adjusting means which adjusts the relative amount of the vertical movement of the bonding stage with respect to the vertical driving means, and a detection means which detects the amount of vertical movement of the bonding stage that is adjusted by the adjusting means.

The bonding stage is raised to the maximum elevation by the vertical driving means so that the pellet on the bonding stage is brought near the film carrier. Then, the bonding stage is raised further via the adjusting means so that the bumps of the pellet are brought into contact with the leads of the film carrier, and the value detected by the detection means at this moment is taken as a reference value. Since the amount of the vertical movement of the bonding stage is detected by the detection means, the clearance between the leads and the bumps is adjusted in a manner such that the bonding stage is lowered via the adjusting means with the bumps in contact with the leads the value detected by the detection means is adjusted to a predetermined amount of forming from the reference value.

DETAILED DESCRIPTION OF THE INVENTION

One embodiment of the present invention will be described below with reference to FIGS. 1 through 4.

Figure 1:
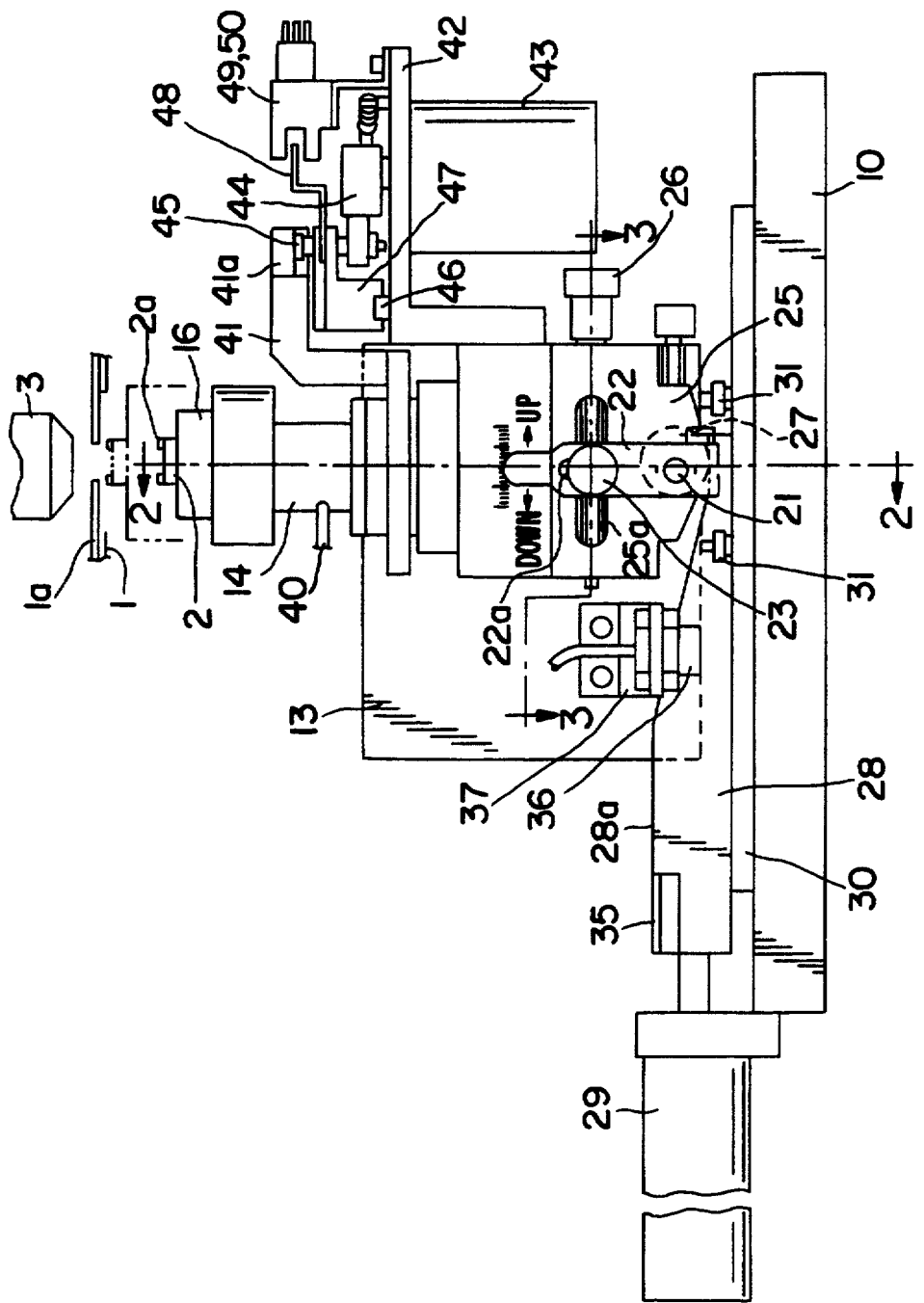
FIG. 1 illustrates the front view of one embodiment of the tape bonding apparatus of the present invention.
Figure 2:
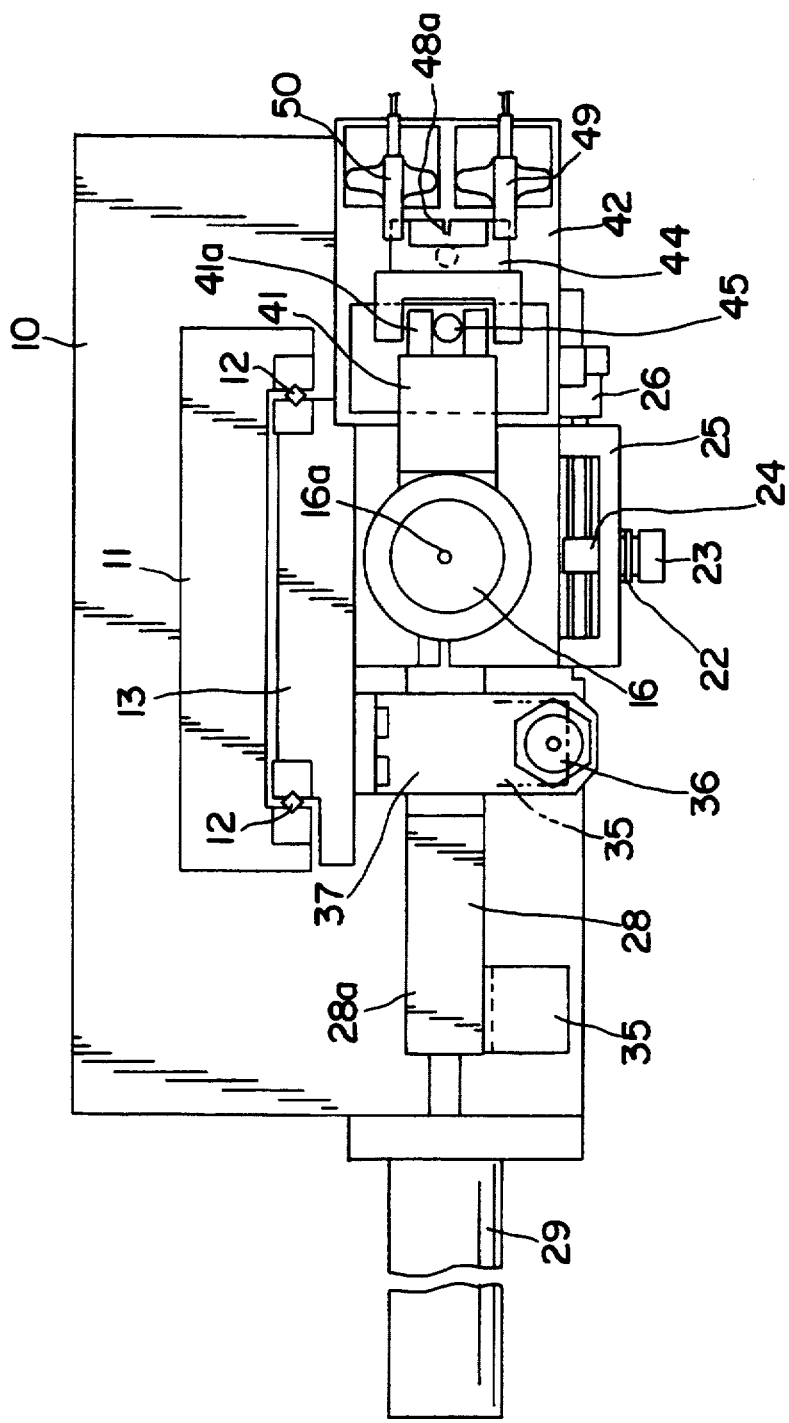
FIG. 2 is a top view of FIG. 1.

As shown in FIG. 2, a supporting block 11 is provided on an XY table 10 which has a known structure and is driven in the X and Y directions by a driving means (not shown). A vertically moving block 13 is mounted to the supporting block 11 via vertically installed cross rollers 12 so that the moving block 13 is free to move up and down (in FIG. 1).

A vertically installed stage-supporting shaft 14 (see FIG. 1) is provided on the vertically moving block 13 via bearings 15 (see FIG. 3) so that the stage-supporting shaft 14 is free to rotate about its axis. A bonding stage 16 is provided on the stage-supporting shaft 14.

Figure 3:
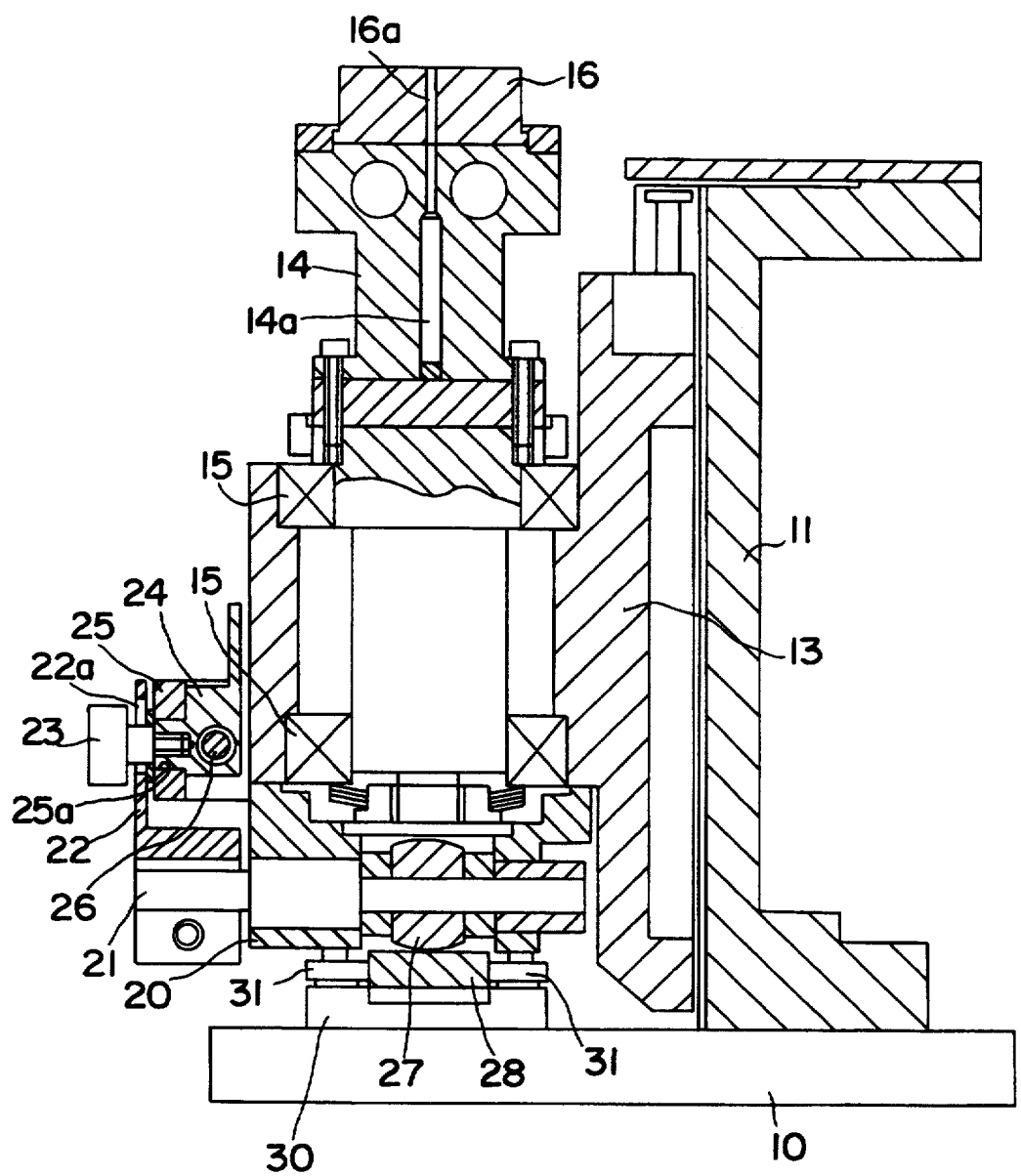
FIG. 3 is an enlarged cross section taken along the line 3—3 in FIG. 1.
Figure 4:
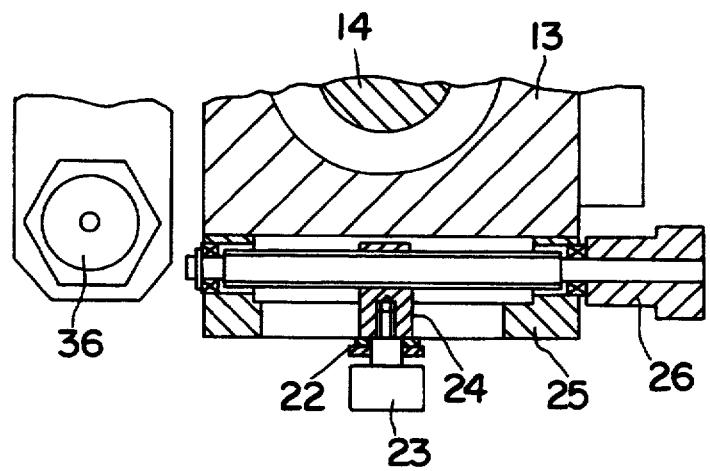
FIG. 4 is an enlarged cross section taken along the line 4—4 in FIG. 1.
Figure 5A:
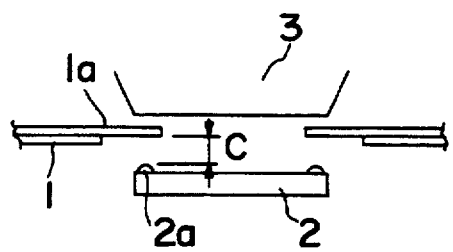
FIGS. 5(a) and 5(b) are explanatory diagrams illustrating the tape bonding.
Figure 5B:
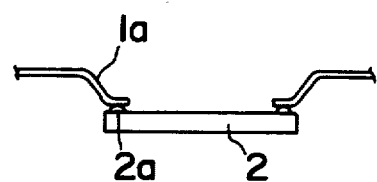

As shown in FIG. 3, a shaft holder 20 is fastened to the vertically moving block 13, and an eccentric shaft 21 which is horizontally installed and can be adjusted up and down is rotatably supported in the shaft holder 20. An adjustment lever 22 has a vertical groove 22a and is attached to one end of the eccentric shaft 21. The shank portion of a lock screw 23 is inserted into the vertical groove 22a, and the screw portion of the lock screw 23 is engaged with a nut 24. The nut 24 is inserted, with play, into a horizontal groove 25a of a supporting plate 25 which is secured to the vertically moving block 13. The nut 24 engages also with the screw portion of an adjusting screw 26 which is rotatably supported on the supporting plate 25.

A cam follower 27 is mounted on the eccentric shaft 21. The cam follower 27 is in contact with a linear cam 28 which has a tapered cam surface on the upper surface. The linear cam 28 is moved horizontally by an air cylinder 29 (see FIG. 1) which is secured to the XY table 10.

A guide block 30 which guides the bottom of the linear cam 28 is mounted on the XY table 10. The guide block 30 is set so as to be on the imaginary line extended from the axis of the cylinder 29. Guide rollers 31 for guiding both sides of the linear cam 28 are supported on the guide block 30 so that the guide rollers 31 are free to rotate.

With the structure above, when the air cylinder 29 is actuated, the cam surface of the linear cam 28 moves the vertically moving block 13 up and down via the cam follower 27. Thus, the bonding stage 16 is also moved up and down. Furthermore, when the lock screw 23 is loosened and the adjusting screw 26 is turned in either direction, the adjustment lever 22 pivots and the eccentric shaft 21 is rotated slightly so that the stage-supporting shaft 14 and the bonding stage 16 is moved up or down along with the vertically moving block 13. Thus, the vertical position of the bonding stage 16 is adjusted.

After the linear cam 28 is advanced (that is, the linear cam 28 is moved to the right in FIG. 1) so that the cam follower 27 is positioned on the apex 28a of the linear cam 28, the adjusting screw 26 is turned; in other words, if the adjusting screw 26 is turned at a state where the bonding stage 16 has been raised via the linear cam 28 to the maximum elevation, then the gap between the leads 1a of the film carrier 1 and the bumps 2a of the pellet 2, i.e., the clearance C between the leads and the bumps, is adjusted.

A detection plate 35 (which is L-shaped) is attached to the air-cylinder side end of the linear cam 28. A gap sensor 36 is provided on the moving block 13 at a point where the gap sensor 36 is above the detection plate 35 when the linear cam 28 has been advanced by the air cylinder 29 and the cam follower 27 rests on the apex 28a of the linear cam 28. This gap sensor 36 is mounted to the vertically moving block 13 via a bracket 37. Furthermore, the gap sensor 36 has a display device (not shown) so that the gap between the gap sensor 36 and the detection plate 35 is shown (to be read) on the display device in a numerical value.

As best seen in FIG. 3, suction adhesion holes 14a and 16a that hold the pellet 2 by vacuum suction adhesion are formed in the upper portion of the stage-supporting shaft 14 and in the bonding stage 16. A pipe 40, as shown in FIG. 1, to which vacuum suction is applied by a vacuum source (not shown) is connected to the suction adhesion hole 14a.

Furthermore, an adjustment lever 41 that adjusts the rotational direction of the pellet 2 is attached to the stage-supporting shaft 14. The end of this adjustment lever 41 has a forked section 41a (see FIG. 2).

A motor bracket 42 is attached to the vertically moving block 13, and a motor 43 is mounted to this motor bracket 42. A block 44 is attached to the output shaft of the motor 43, and a roller shaft 45 is supported on the block 44 so that the roller shaft 45 is free to rotate in the forked section 41a of the adjustment lever 41. In addition, a guide 46 is mounted on the upper surface of the motor bracket 42, and a detection plate supporting block 47 which holds the roller shaft 45 is installed on this guide 46 so that the supporting block 47 is free to slide. A detection plate 48 which has a slit 48a is attached to the detection plate supporting block 47. In order to regulate the sliding range of this detection plate 48, i.e., in order to regulate the range of rotation of the adjustment lever 41, two photosensors 49 and 50 which detect the slit 48a of the detection plate 48 are provided on the motor bracket 42.

Accordingly, when the motor 43 is actuated, the adjustment lever 41 is caused, via the block 44 and the roller shaft 45, to rotate with the axis of the stage-supporting shaft 14 as a rotating center; as a result, the stage-supporting shaft 14 is rotated. In this way, the horizontal rotational position of the pellet 2 can be adjusted.

In the structure above, the bonding operation is performed in the following manner:

With the pellet 2 placed on the bonding stage 16 by a means not shown in the Figures, vacuum suction is applied to the suction adhesion hole 16a. Thus, the pellet 2 is held on the bonding stage 16.

Then, the position of the pellet 2 is detected by a camera (not shown), and the rotational position of the pellet 2 with respect to the leads 1a of the film carrier 1 is corrected by the rotation of the motor 43 as described above. The XY table 10 is also moved in the X and Y directions so that the XY position of the pellet 2 with respect to the leads 1a is adjusted.

Then, the air cylinder 29 is actuated, which causes the bonding stage 16 to be raised as described above. Also, the bonding tool 3, which is moved vertically and rotated in the X and Y directions by a driving means (not shown), is lowered to bond the leads 1a to the bumps 2a of the pellet 2.

Afterward, the bonding tool 3 is raised, and the air cylinder 29 is actuated in the reverse direction to retrieve the linear cam 28. Thus, the bonding stage 16 is lowered.

Before the bonding operation as described above is performed, the clearance C between the leads 1a of the film carrier 1 and the bumps 2a of the pellet 2 is adjusted in the following manner:

The air cylinder 29 is actuated so that the linear cam 28 is advanced and the bonding stage 16 is raised to its maximum elevation level. With this raising movement, the gap sensor 36 is also raised together with the vertically moving block 13, and the detection plate 35 is brought directly beneath the gap sensor 36. In this state, the lock screw 23 is loosened and the adjusting screw 26 is turned until the bonding stage 16 is raised to a position where the bumps 2a comes into contact with leads 1a. At this point, the display device of the gap sensor 36 is reset so that the numerical value displayed thereon becomes zero.

Next, the adjusting screw 26 is turned in the reverse direction so that the bonding stage 16 is gradually lowered until the numerical value displayed on the display device becomes a value which is a predetermined amount of forming. Afterward, the lock screw 23 is tightened back. The clearance C is thus adjusted in a simple manner.

Since the gap sensor 36 performs the sensing constantly, the amount of clearance C at the maximum elevation level of the bonding stage 16 is displayed even when the apparatus is in operation. Thus, the amount of forming can be monitored constantly.

In the embodiment described above, the gap sensor 36 is provided on the vertically moving block 13, and the detection plate 35 is provided on the linear cam 28. However, it would be possible to mount the detection plate 35 to the vertically moving block 13 and the gap sensor 36 to the liner cam 28. Furthermore, it would also be possible to mount either the gap sensor 36 or the detection plate 35 on the vertically moving block 13 and attach the other to a fixed part of the apparatus, for example, to the guide block 30. In this case, however, the gap between the gap sensor 36 and the detection plate 35 would be widened by the amount that corresponds to the vertically moving block 13 raised by the linear cam 28. Accordingly, such an arrangement is not quite desirable. In this regard, by mounting the detection plate 35 or the gap sensor 36 to the linear cam 28 as in the embodiment described above, it is possible to make the gap between the gap sensor 36 and the detection plate 35 smaller. Accordingly, such an arrangement as shown in the Figures is very desirable.

As seen from the above, according to present invention, the amount of forming can be read directly as a numerical value. Accordingly, the amount of forming can be easily set, and the variation in the amount of forming that would be caused by different workers can be avoided. In addition, the amount of forming can be constantly monitored even during the operation of the apparatus.

We claim:

1. A tape bonding apparatus which pressure-bonds leads of a film carrier to bumps of a pellet comprising:

a bonding stage provided on a stage-supporting shaft to carry said pellet, said stage-supporting shaft being mounted on a vertically moving block which is provided on an XY table;

a linear cam with a tapered top surface, said linear cam being provided on said XY table and sliding horizontally to move said bonding stage up and down via said tapered surface;

an adjusting means which adjusts a relative amount of a vertical movement of said bonding stage with respect to said linear cam, said adjusting means comprising an eccentric shaft provided at a bottom of said stage-supporting shaft, an adjustment lever connected to said eccentric shaft at one end, and an adjusting screw provided on said vertically moving block so as to cause said vertical movement of said bonding stage by allowing said adjustment lever to pivot; and a detection means which detects an amount of said vertical movement of said bonding stage caused by said adjusting means, said detection means comprising a detection plate provided on said linear cam and a gap sensor provided on said vertically moving block.

* * * * *